United States Patent
Arenz et al.

(10) Patent No.: US 7,900,531 B2
(45) Date of Patent: Mar. 8, 2011

(54) DRIVE DEVICE

(75) Inventors: Bernd Arenz, Herschbroich (DE); Oleg Batosky, Lahnstein (DE); Jörg Hillen, Nörtershausen (DE)

(73) Assignee: Stabilus GmbH, Koblenz (DE)

( * ) Notice: Subject to any disclaimer, the term of this patent is extended or adjusted under 35 U.S.C. 154(b) by 371 days.

(21) Appl. No.: 12/150,854

(22) Filed: May 1, 2008

(65) Prior Publication Data

US 2008/0271552 A1     Nov. 6, 2008

(30) Foreign Application Priority Data

May 2, 2007   (DE) .......................... 10 2007 020 826

(51) Int. Cl.
*F16H 29/20*     (2006.01)
(52) U.S. Cl. ......... 74/89.38; 192/36; 192/54.5; 192/93 A
(58) Field of Classification Search ................ 74/89.38, 74/89.23; 192/36, 54.5, 93 A
See application file for complete search history.

(56) References Cited

U.S. PATENT DOCUMENTS

| | | | | |
|---|---|---|---|---|
| 3,918,559 A | * | 11/1975 | Rousset | 192/54.5 |
| 5,944,376 A | * | 8/1999 | Buchanan, Jr. | 296/146.4 |
| 7,431,136 B2 | * | 10/2008 | Simm et al. | 192/34 |
| 7,665,794 B2 | * | 2/2010 | Kachouh | 296/146.3 |
| 2010/0162839 A1 | * | 7/2010 | Reif et al. | 74/89.38 |

* cited by examiner

*Primary Examiner* — Richard W Ridley
*Assistant Examiner* — Terence Boes
(74) *Attorney, Agent, or Firm* — Cohen Pontani Lieberman & Pavane LLP

(57) ABSTRACT

In a drive device for opening and or closing the hatch of a motor vehicle, the drive including a spindle drive with a threaded spindle and a nut, with a clutch arranged between the rotary drive and the spindle drive, the clutch includes a shifting element, a clutch element, and a clutch disk non-rotatably connected to the threaded spindle. The shifting element is rotatably drivably connected to the rotary drive. The shifting element has an axially oriented helical first ramp and the clutch element has an axially oriented helical second ramp in opposed contact with said first ramp. Relative rotation of the shifting element and the clutch element causes relative axial displacement of the shifting element and the clutch element against a spring force. The clutch element has a clutch area movable into non-rotatable engagement with the clutch disk in response to the relative axial displacement of the shifting element and the clutch element such that the rotary drive for the spindle drive also operates the clutch.

15 Claims, 4 Drawing Sheets

DRIVE DEVICE

BACKGROUND OF THE INVENTION

1. Field of the Invention

The present invention relates to a drive device for moving a movable component relative to a stationary component. More specifically, the drive device moves a hatch of a vehicle relative to the vehicle body. The drive device includes a first fastening element connectable to one of the stationary component and the movable component, and a housing tube axially movable relative to the first fastening element and disposed on an end of the drive device opposite the first fastening element, the housing tube having a second fastening element connectable to the other of the stationary component and the movable component. The drive device further includes a spindle drive actuatable to move the housing tube axially relative to the first fastening element and including a threaded spindle and a nut. A drive device also includes rotary drive and a clutch, the rotary drive being drivably connected to the spindle drive through the clutch, which is open when the drive device is not actuated and which closes when the drive device is actuated.

2. Description of the Related Art

In drive devices of the type described above, it should be possible to move the hatch manually even without the drive device. The manual forces required for this purpose should be as small as possible. These forces are reduced by opening the clutch.

A disadvantage of the clutches is that they require an electrical or electromagnetic drive for opening or closing the clutch, which is expensive and complicated.

SUMMARY OF THE INVENTION

An object of the present invention is to create a drive device of the type indicated above which can be actuated manually with little force and which does not require a separate drive.

The object is achieved according to the invention in that a shifting element for opening or closing the clutch can be driven in rotation by the rotary drive which also drives the spindle drive. The shifting element has an axially oriented first ramp, extending concentrically in the circumferential direction, which is in contact with an axially opposing second ramp, extending concentrically in the circumferential direction, of a clutch element of the clutch such that, by relative rotation of the shifting element and the clutch element in opposition to the force of a spring, a relative axial displacement of the clutch element versus the shifting element occurs. The clutch element will not rotate until a certain torque is exceeded, but after this certain torque is exceeded, the clutch element is carried along in rotation by the shifting element. Furthermore, the clutch element has a clutch area, which can be brought into nonrotatable engagement with a clutch disk, which is connected nonrotatably to the threaded spindle.

According to the present invention, the need for a separate drive for the clutch is obviated, because the rotary drive not only drives the shifting element in rotation but also necessarily closes the clutch mechanically. Thus, there is no need for a separate electric drive and an electrical control unit for the clutch.

After the rotary drive has stopped operating, the clutch opens again automatically.

The clutch area can be brought into engagement positively or also frictionally and/or nonpositively with the clutch disk.

According to a space-saving embodiment of the invention, the clutch area has a first concentric radially-extending circumferential friction surface, which faces an axially opposing second concentric radially-extending circumferential friction surface of the clutch disk.

In a further embodiment, space is also saved by designing the first ramp and the second ramp in the form of rings.

The first ramp and the second ramp each preferably consist of two ramp sections, which rise in opposite axial directions over a distance of 180°, thus forming a first elevation, which is on the clutch element, and a second elevation, which is on the shifting element.

According to a further embodiment, the shifting element is an axially stationary, rotatably supported, cup-like shifting sleeve, and is surrounded by a clutch sleeve forming the clutch element. This embodiment also saves space because the one component can be mounted inside the other.

To hold the clutch sleeve stationary until the above-mentioned minimum torque is reached, the outer circumferential lateral surface of the clutch sleeve includes a circumferential friction surface which contacts one or more nonrotatable friction elements.

According to a preferred embodiment, the second ramp, i.e., the ramp on the clutch sleeve, is preferably held in contact with the first ramp, i.e., the ramp on the shifting sleeve, by a spring element, i.e., a pretensioned compression spring.

In yet a further embodiment of the present invention, a cylindrical inside wall of the clutch sleeve is supported on the outer cylindrical lateral surface of the shifting sleeve so that the clutch sleeve is rotatable and axially movable.

In another simple and space-saving embodiment, the shifting sleeve is rotatably supported on a coaxial journal of a shaft, which is connected nonrotatably to the clutch disk.

To reduce the rotational speed and to increase the torque, the shifting element can be driven in rotation by a take-off shaft of a gearbox, the drive shaft of which can be driven by the rotary drive.

The rotary drive is preferably an electric motor.

A compact unit is obtained by mounting the rotary drive and/or the gearbox permanently in the housing tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
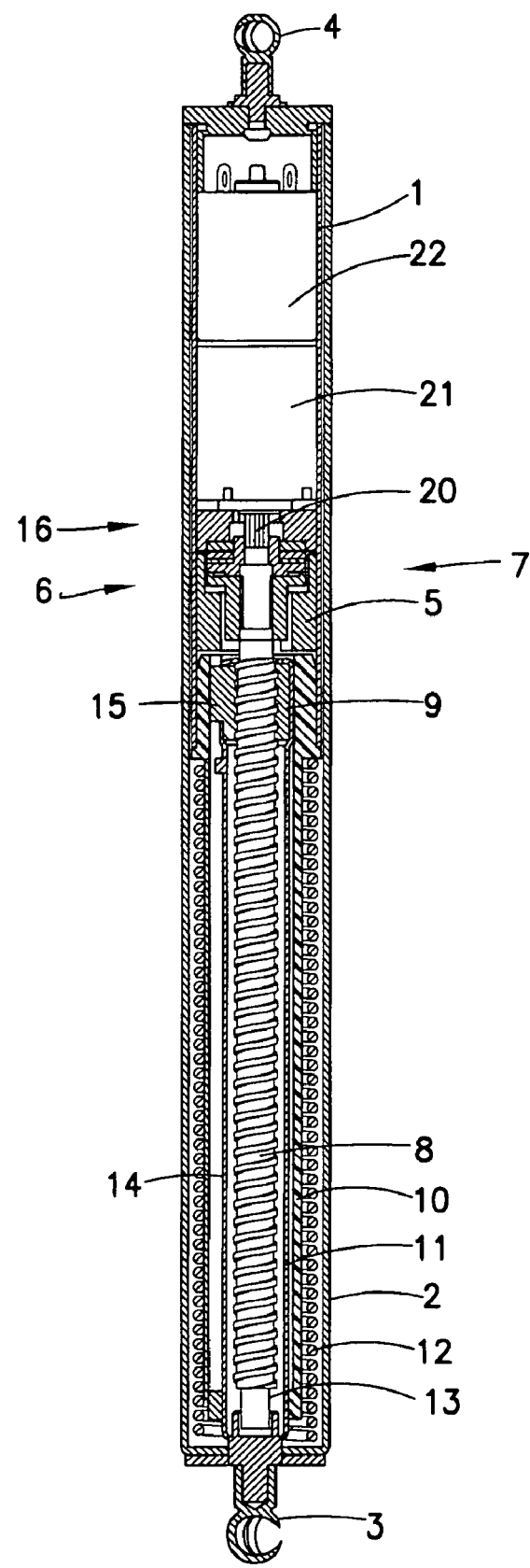
FIG. 1 is a cross sectional view of a drive device according to the present invention.

A drive device according to an embodiment of the present invention is shown in FIG. 1 and includes a housing tube 1, over which an outer tube 2 can slide telescopically back and forth.

At the end of the outer tube 2 opposite the housing tube 1, a first ball socket 3 is mounted, and on the end of the housing tube 1 opposite the outer tube 2, a second ball socket 4 is provided. Using these balls sockets 3, 4, the drive device can be articulated to a stationary body part of a motor vehicle and to a movable part of the motor vehicle, designed as a hatch. Although ball sockets are used in the present embodiment, any fastening elements known or hereafter developed for providing the articulated connection may be used instead of the ball sockets.

Figure 2:
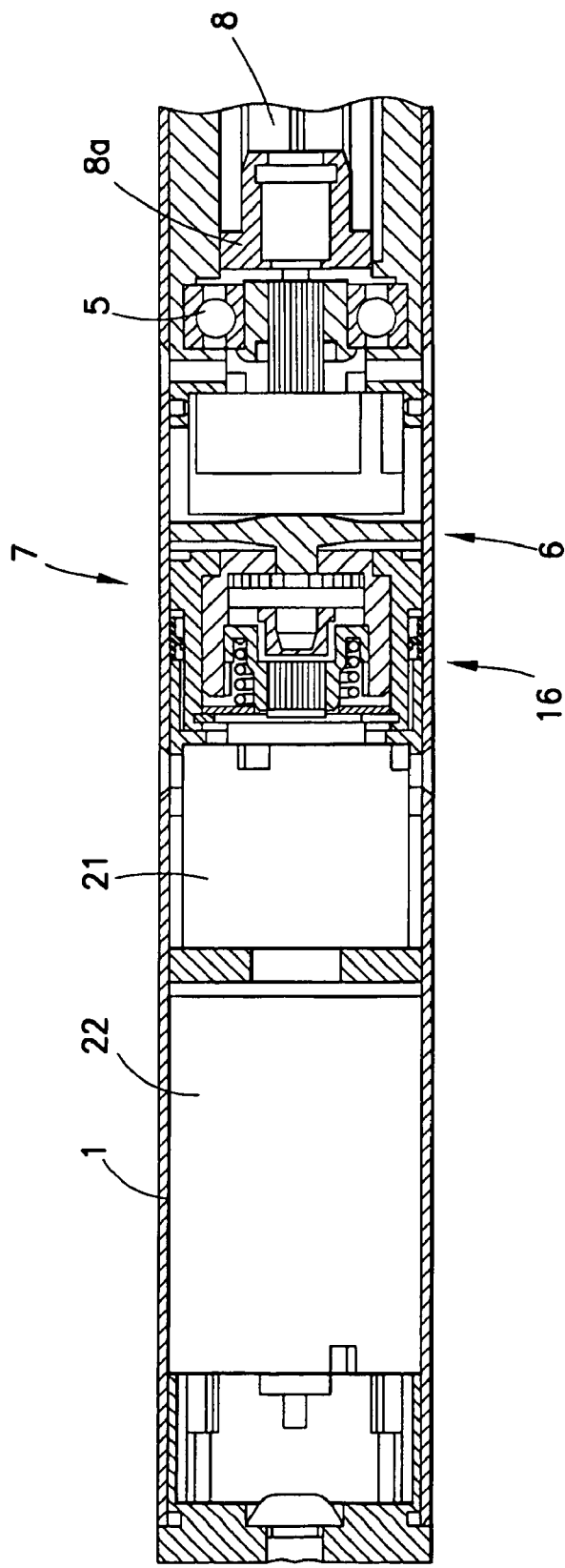
FIG. 2 is a cross sectional view of a portion of a drive device according to an embodiment of the present invention.

In the end area of the housing tube 1 facing the outer tube 2, a first bearing part 5 is permanently installed, in which a first clutch part 6 of a friction clutch 7 is rotatably supported, either directly or by way of a spindle mounting sleeve 8a (see FIG. 2), which is permanently seated on one end of a threaded spindle 8 projecting into the outer tube 2.

A spindle nut 9 is mounted on the threaded spindle 8 nonrotatably with respect to the housing tube 1.

The spindle nut 9 is connected to one end of a spindle tube 11, which coaxially surrounds the threaded spindle 8. The first ball socket 3 is permanently mounted on the other end of the spindle tube 11.

A guide tube 10 is permanently connected to the housing tube 1 and surrounds the spindle tube 11. The spindle nut 9 is free to slide axially back and forth inside the guide tube 10.

The outer tube 2 is larger than the guide tube 10 and surrounds the guide tube 10 such that an annular gap is defined therebetween. In the annular gap between the guide tube 10 and the larger outer tube 2, a helical compression spring 12 is provided. One end of the spring 12 is supported against the outer tube 2 in the area of the first ball socket 3, and the other end of the spring 12 is supported against the housing tube 1.

The threaded spindle 8 carries a guide sleeve 13 on an end of the threaded spindle 8 facing away from the first clutch part 6. The cylindrical lateral surface of the guide sleeve 13 guides the threaded spindle 8 so that the threaded spindle is free to move axially back and forth in the spindle tube 11.

The guide tube 10 has three axial slots 14, which are distributed uniformly around the circumference and which extend over almost the entire length of the guide tube 10.

Radially projecting support pins 15 are arranged on the spindle nut 9 in correspondence with the axial slots 14. The pins 15 project into the axial slots 14 and ensure that the spindle nut 9 cannot turn with respect to the guide tube 10.

Coaxially with and opposing the first clutch part 6, a second clutch part 16 is disposed in the housing tube 1. An annular friction surface is provided on each of the two clutch parts 6 and 16.

The second clutch part 16 includes additional components which allow for movement to occur between the first clutch part 6 and the second clutch part 16, so that the two clutch parts 6, 16 can move axially away from each other, thus releasing the frictional connection, or axially toward each other, thus establishing a frictional connection, as will be described below on the basis of FIGS. 2-5.

A takeoff shaft 20 of a preferably multi-stage gearbox 21 is mounted coaxially to the second clutch part 16. The gearbox 21 is driven in rotation by a rotary drive 22, i.e., an electric motor.

FIGS. 2-5 each show a part of the drive device illustrated in FIG. 1, more specifically the individual components of the clutch 7.

An adapter element 23 disposed in the clutch 7 is mounted on the takeoff shaft 20 of the gearbox 21 and rotates along with the takeoff shaft 20. The takeoff shaft 20 and the adapter element 23 are connected to each other by a positive or nonpositive connection, preferably by serrations 24.

The adapter element 23 is connected in axially movable fashion to a shifting sleeve 26 by a set of external serrations 25. The shifting sleeve 26 is designed as a shifting element of the clutch 7. A guide area 27 is disposed at the end of the shifting sleeve 26 opposite the adapter element 23. The shifting sleeve 26 uses the guide area 27 to move and guide a clutch element in the axial direction, the clutch element being a clutch sleeve 28 which surrounds the shifting sleeve 26.

When the rotary drive 22 is deactivated, a spring element 29 pushes the clutch sleeve 28 axially toward the gearbox 21 and thus away from the first clutch part 6. The spring element 29 is supported on one side against the adapter element 23 and on the other side against a bearing disk 30. Although the spring element 29 is shown as a helical compression spring, the spring element may alternatively comprise a disk spring or any other known or hereafter developed spring element which pushes the clutch sleeve 28 axially toward the gearbox 21 and thus away from the first clutch part 6. The bearing disk 30 rests against another ring-shaped disk 31, which is supported in turn by a locking or retaining ring 32. The locking ring 32 is mounted in the clutch sleeve 28.

A sleeve-like retaining device 33 with a stop device 34 on its inside surface extends from the housing of the gearbox 21 toward the clutch sleeve 28. The retaining device 33 can be a separate component, which is supported by its stop device 34 axially against the housing of the gearbox 21, or it can be an integral part of the housing of the gearbox 21. The retaining device 33 surrounds at least part of the clutch sleeve 28.

A friction ring 35 is installed next to the retaining device 33. The friction ring 35 also surrounds the clutch sleeve 28 and prevents the clutch sleeve 28 from rotating when the rotary drive 22 is turned on. The friction ring 35 has at least one, preferably several, elastic projections, which extend inward from the inside surface of the friction ring 35 essentially in the radial direction toward the clutch sleeve 28, against which they rest with pretension.

The first clutch part 6 comprises a first shaft 38 facing the gearbox 21 and a second shaft 39 connected to the threaded spindle 8. Since the second shaft 39 is connected to the threaded spindle 8, the first clutch part 6 is prevented from shifting position in the axial direction. A clutch disk 40 is disposed between the first shaft 38 and the second shaft 39. The first shaft 38, the clutch disk 40, and the second shaft 39 are preferably connected integrally to each other and may be formed as a single piece. The first shaft 38 projects all the way through the shifting sleeve 26. A nut 41, which holds an axial bearing 42 in position between the end of the first shaft 38 of the first clutch part 6 and the shifting sleeve 26, is threaded onto the end of the first shaft 38.

A stop element 43 of felt, plastic, or the like, which can be designed in the form of a ring, for example, is provided between the shifting sleeve 26 and the clutch disk 40. Alternatively, the stop element 43 may also comprise a spring.

Figure 3:
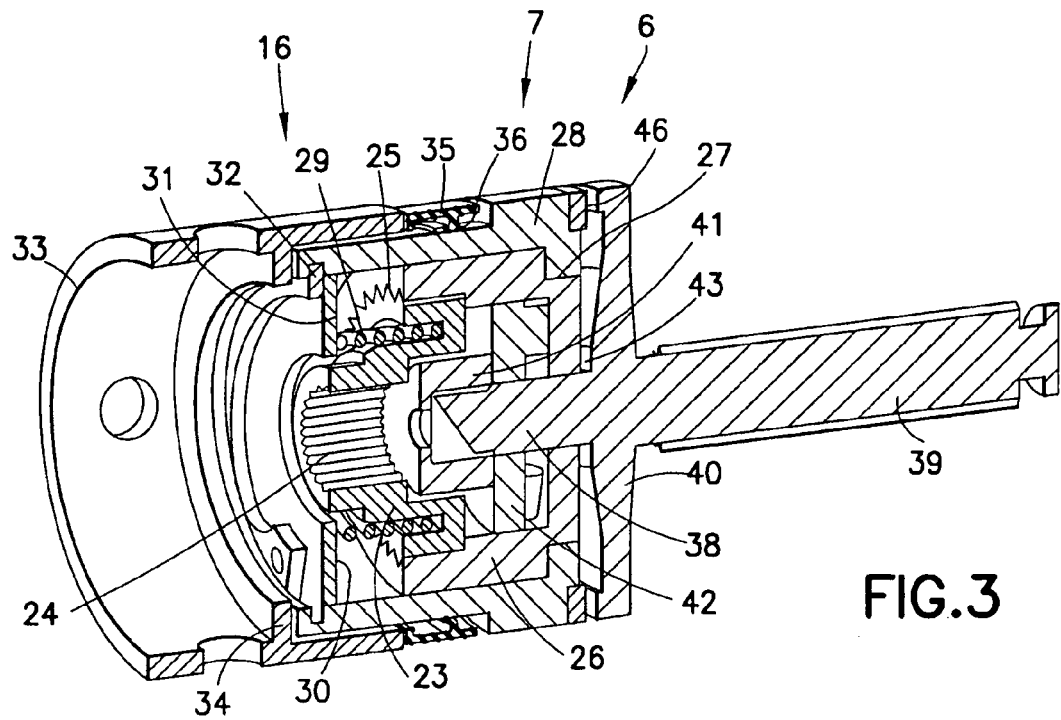
FIG. 3 is a more detailed cross-sectional view of a part of the drive device according to FIG. 2.
Figure 4:
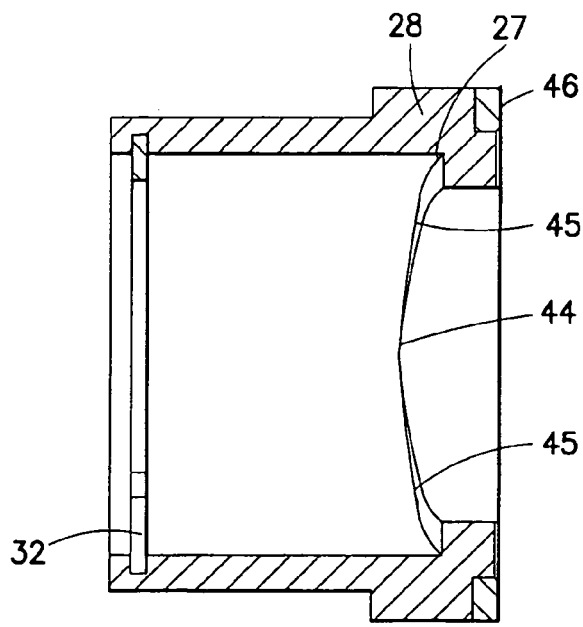
FIG. 4 is a cross section through a part of the device shown in FIG. 3.

As shown in FIG. 4, at the end of the clutch sleeve 28 opposite the locking ring 32 a surface facing the guide area 27 of the shifting sleeve 26 has an elevation 44 projecting axially into the interior space of the clutch sleeve 28. The flanks 45 of this elevation 44 form a helically-shaped ramp, track or inclined plane. Preferably two opposing axially symmetric elevations 44 are formed in the clutch sleeve 28. On the end surface of the clutch sleeve 28 facing the clutch disk 40 of the first clutch part 6, as shown in FIG. 3, furthermore, a friction surface 46 is provided, which can be brought into frictional connection with the clutch disk 40 of the first clutch part 6.

Figure 5:
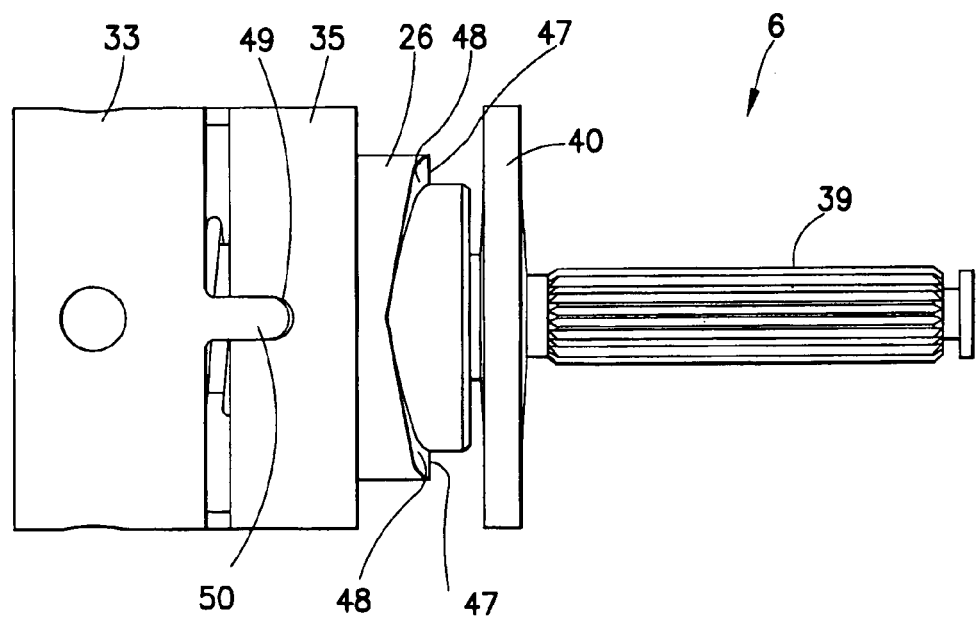
FIG. 5 is a side view of the part of the drive device shown in FIG. 3.

FIG. 5 shows that on the end surface of the shifting sleeve 26 facing the clutch disk 40, the shifting sleeve 26 also has elevations 47 which are arranged in the guide area 27. The flanks 48 of these elevations 47 form a helical-shaped ramp, track or inclined plane. Again, two opposite elevations 47 are preferably formed on the shifting sleeve 26, which cooperate directly with the elevations 44 and with the corresponding flanks 45 of the clutch sleeve 28 which are described above and shown in FIG. 4.

On the side of the friction ring 35 facing the retaining device 33, the friction ring 35 has several openings 49, into which corresponding projections 50 on the retaining device 33 are received.

When the rotary drive 22 is activated, its speed is reduced by the gearbox 21, and torque is transmitted via the takeoff shaft 20 of the gearbox 21 to the adapter element 23. The adapter element 23 is connected to the shifting sleeve 26 by the external serrations 25 and is thus able to slide axially back and forth while transmitting a torque to the shifting sleeve 26. Accordingly, the shifting sleeve 26 turns or rotates when the takeoff shaft rotates. Because of the elevations 44 and 47 formed on the shifting sleeve 26 and on the clutch sleeve 28, and because of the ramp-shaped or helical-shaped circumferential tracks formed by the flanks 45 and 48 the rotational movement generates an axial movement of the clutch sleeve 28 (the axial movement of the clutch sleeve 28 is also facilitated by the friction ring 35 which prevents the clutch sleeve 28 from rotating during the shifting process). The axial movement of the clutch sleeve 28 continues until the friction disk 46 on the end surface of the clutch sleeve 28 rests against the clutch disk 40 of the first clutch part 6. The friction ring 35 moves in the axial direction together with the clutch sleeve 28, because there is only a weak frictional force acting in the axial direction at the projections 50 and the openings 49.

When the clutch sleeve 28 and the clutch disk 40 are resting against each other, all of the torque is acting on the clutch sleeve 28, and the frictional force exerted by the friction ring 35 on the clutch sleeve 28 is overcome. As a result, the clutch sleeve 28 and thus the clutch disk 40 start to rotate.

In this position, the clutch sleeve 28 is clamped between the shifting sleeve 26 and the clutch disk 40 and transmits torque and rotational movement to the first clutch part 6, thereby turning the threaded spindle 8.

Thus, the clutch 7 is closed by the shifting process, between the clutch disk 40, the first shaft 38, the axial bearing 42, the nut 41, the shifting sleeve 26, and the clutch sleeve 28. The clutch 7 can be opened from the closed state by briefly turning the rotary drive 22 back or by manually interrupting the flow of forces.

In the opened state of the clutch 7, the spring element 29 presses the clutch sleeve 28 away from the clutch disk 40 and into the rest position. The bearing disk 30 reduces the frictional moment which is introduced into the clutch sleeve 28 by the support of the spring 29. Instead of a bearing disk, an axial bearing could alternatively be used here.

The circumferential tracks formed by the elevations 44 and 47 and by their flanks 45 and 48 are designed for both directions of rotation and serve as slideways. Alternatively, the slideways or circumferential tracks may also be designed as ball tracks for roller balls or as raceways for rolling elements, or realized by radially outward-projecting or inward-projecting pins, which slide along the inclined plane. As previously mentioned, the clutch 7 thus acts in both directions.

The stop element 43 prevents direct contact between the shifting sleeve 26 and the clutch disk 40 in the open state. Alternatively, a certain frictional moment can be generated between the clutch disk 40 and the shifting sleeve 26 by an appropriate component such as a spring, which, if desired, generates a defined frictional moment even when the clutch 7 is open.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for moving a movable component relative to a stationary component, the drive device comprising:
    a first fastening element connectable to one of the stationary component and the movable component;
    a housing tube axially movable relative to said first fastening element and disposed on an end of said drive device opposite said first fastening element, said housing tube having a second fastening element connectable to the other of the stationary component and the movable component;
    a spindle drive actuatable to move said housing tube axially relative to said first fastening element and including a threaded spindle and a nut; and
    a rotary drive and a clutch which is open when said rotary drive is not actuated and which closes when said rotary drive is actuated, said rotary drive being drivably connected to said spindle drive through said clutch,
    said clutch comprising a shifting element, a clutch element, and a clutch disk non-rotatably connected to said threaded spindle, said shifting element being rotatably drivably connected to said rotary drive, said shifting element having an axially oriented helical first ramp and said clutch element having an axially oriented helical second ramp in opposed contact with said first ramp, a spring element being disposed between said shifting element and said clutch element, said clutch element operatively arranged so that said clutch element is prevented from rotating until a predetermined torque is exceeded such that relative rotation of said shifting element and said clutch element causes relative axial displacement of said shifting element and said clutch element against a spring force of said spring element, said clutch element having a clutch area movable into non-rotatable engagement with said clutch disk in response to the relative axial displacement of said shifting element and said clutch element,
    wherein said shifting element is an axially stationary, rotatably supported, cup-shaped shifting sleeve, and said clutch element comprises a clutch sleeve at least partially surrounding said shifting sleeve.

2. The drive device of claim 1, wherein said clutch area is brought into positive engagement with the clutch disk in response to the relative axial displacement of said shifting element and said clutch element.

3. The drive device of claim 1, wherein said clutch area is brought into at least one of frictional and nonpositive engagement with said clutch disk in response to the relative axial displacement of said shifting element and said clutch element.

4. The drive device of claim 3, wherein said clutch area has a first concentric radially-extending circumferential friction surface arranged axially opposite a second concentric radially-extending circumferential friction surface of said clutch disk.

5. The drive device of claim 1, wherein said first ramp and said second ramp each comprise a ring.

6. The drive device of claim 5, wherein said first ramp and said second ramp each consist of two ramp sections, rising in opposite direction over a distance of 180°, thus forming a first axial elevation on said clutch element and a second axial elevation on said shifting element.

7. The drive device of claim 1, wherein said clutch sleeve has, on an outer circumferential surface, a radially-facing circumferential friction surface, said drive device comprising at least one non-rotatable friction element prestressed against said circumferential friction surface preventing rotation of said clutch sleeve until a predetermined torque is exceeded.

8. The drive device of claim 1, wherein said spring element is a pretensioned compression spring and said second ramp on said clutch sleeve is held against said first ramp on said shifting sleeve by said spring element.

9. The drive device of claim 1, wherein a cylindrical inner wall of said clutch sleeve is supported on an outer cylindrical lateral surface of said shifting sleeve so that said clutch sleeve is rotatable and axially slidable.

10. The drive device of claim 1, wherein said shifting element is rotatably supported on a coaxial journal of a shaft that is nonrotatably connected to said clutch disk.

11. The drive device of claim 1, further comprising a gearbox drivably connected to said rotary drive and having a takeoff shaft, said shifting element being driven in rotation by said takeoff shaft.

12. The drive device of claim 11, wherein said rotary drive and said gearbox are fixedly mounted in said housing tube.

13. The drive device of claim 1, wherein said rotary drive is an electric motor.

14. The drive device of claim 1, wherein said rotary drive is fixedly mounted in said housing tube.

15. The drive device of claim 1, wherein the movable component is a hatch of a motor vehicle such that said drive device is operable for opening or closing the hatch.

* * * * *